United States Patent
Heikkilä

(10) Patent No.: US 6,552,510 B2
(45) Date of Patent: Apr. 22, 2003

(54) METHOD FOR FREQUENCY CONVERTER

(75) Inventor: Samuli Heikkilä, Helsinki (FI)

(73) Assignee: ABB Oy, Helsinki (FI)

(*) Notice: Subject to any disclaimer, the term of this patent is extended or adjusted under 35 U.S.C. 154(b) by 0 days.

(21) Appl. No.: 10/020,156

(22) Filed: Dec. 18, 2001

(65) Prior Publication Data

US 2002/0113570 A1 Aug. 22, 2002

(30) Foreign Application Priority Data

Dec. 22, 2000 (FI) .................................................. 002843

(51) Int. Cl.$^7$ ................................................ H02P 5/40
(52) U.S. Cl. ..................... 318/807; 318/808; 318/812; 363/149; 363/161; 363/165
(58) Field of Search ................ 318/807, 812, 318/808; 363/165, 149, 161

(56) References Cited

U.S. PATENT DOCUMENTS

| | | | | |
|---|---|---|---|---|
| 4,677,360 A | * | 6/1987 | Garces ........................ 318/803 |
| 4,707,651 A | * | 11/1987 | Schauder .................... 318/800 |
| 4,926,105 A | * | 5/1990 | Mischenko et al. ......... 318/800 |
| 4,968,925 A | * | 11/1990 | De Doncker ............... 318/727 |
| 5,010,288 A | * | 4/1991 | Poline ........................ 318/803 |
| 5,194,797 A | * | 3/1993 | Kahkipuro .................. 318/727 |
| 5,272,429 A | * | 12/1993 | Lipo et al. ................... 318/802 |
| 5,907,228 A | | 5/1999 | Thomas et al. .......... 318/568.1 |
| 5,942,874 A | * | 8/1999 | Vaananen et al. ........... 318/762 |
| 6,094,364 A | * | 7/2000 | Heikkila ..................... 318/807 |
| 6,137,258 A | * | 10/2000 | Jansen ........................ 318/802 |

FOREIGN PATENT DOCUMENTS

| | | |
|---|---|---|
| DE | A1 19612988 | 9/1997 |
| DE | C1 19640591 | 4/1998 |

* cited by examiner

Primary Examiner—Rita Leykin
(74) Attorney, Agent, or Firm—Dykema Gossett, PLLC.

(57) ABSTRACT

A method for a frequency converter, when the frequency converter controls a motor and operates torque-controlled partly or entirely in a field weakening region. The method comprises the steps of defining the direction of travel and sector of a stator flux vector ($\overline{\psi}_s$) in the motor, predicting a torque estimate ($T_{pred}$) produced by a voltage vector of the output of the frequency converter at the end of the voltage vector when a voltage vector change occurs at the instant of prediction, comparing the predicted torque estimate ($T_{pred}$) with a reference torque ($T_{ref}$) of the frequency converter, and implementing the voltage vector change when the predicted torque estimate ($T_{pred}$) is smaller than the reference torque ($T_{ref}$) and the stator flux vector ($\overline{\psi}_s$) is moving in a positive direction of travel or when the torque estimate ($T_{pred}$) is greater than the reference torque ($T_{ref}$) and the stator flux vector ($\overline{\psi}_s$) is moving in a negative direction of travel.

2 Claims, 3 Drawing Sheets

METHOD FOR FREQUENCY CONVERTER

BACKGROUND OF THE INVENTION

The invention relates to a method for a frequency converter, when the frequency converter controls a motor and operates torque-controlled partly or entirely in a field weakening region.

By using frequency converters, the rotation speed of a controlled motor can be increased considerably above the nominal frequency of the motor. Increasing the rotation speed above the nominal frequency requires typically a reduction in magnetization, whereby the output frequency increases above a field weakening point, i.e. the machine is said to be in a field weakening region.

Earlier, solutions based on direct torque control have tried to control a flux phasor in the field weakening region in such a manner that its head forms a circle in the spatial coordinates. At the same time they have tried to avoid using zero phasors in keeping the voltage in the motor poles as high as possible. A maximum voltage would be achieved, if the flux phasor formed a hexagon. Each angle of the hexagon would correspond to the directions of voltage vectors. With such a shape, it would be possible, in theory, to achieve a 20% increase in the torque in the field weakening region as compared with a circular flux trajectory. Eliminating the zero phasors has not, however, been successful with the earlier implementations and with a hexagonal flux, and thus, it has not been possible to utilize a maximum voltage.

In the earlier implementations, control is based on complex calculations that due to the complexity need to be done in a slow time domain, whereby the stability and dynamics of the control suffer at high rotation speeds.

BRIEF DESCRIPTION OF THE INVENTION

It is an object of the present invention to provide a method that avoids the above-mentioned drawbacks and enables the control of a motor torque in a field weakening region more reliably than before. This object is achieved by a method of the invention that is characterized by comprising the steps of defining the direction of travel and sector of a stator flux vector in the motor, predicting a torque estimate produced by the output voltage vector of a frequency converter at the end of the voltage vector when a change of voltage vector occurs at the instant of prediction, comparing the predicted torque estimate with the frequency converter reference torque, and implementing the voltage vector change when the predicted torque estimate is smaller than the reference torque and the stator flux vector is moving in a positive direction of travel or when the torque estimate is greater than the reference torque and the stator flux vector is moving in a negative direction of travel.

The invention is based on the idea that the change caused by the voltage vector change to the torque can be predicted in a simple and reliable manner. In the method of the invention, the torque can be predicted in the fastest time domain of control, whereby the dynamics and stability of the control are ensured. In addition, by means of the method of the invention, it is possible to utilize in a field weakening region the entire voltage of the intermediate circuit of the frequency converter, since the control implemented by means of the method uses no zero-voltage vectors.

BRIEF DESCRIPTION OF THE FIGURES

The invention will now be described in more detail by means of preferred embodiments and with reference to the attached drawings, in which.

DETAILED DESCRIPTION OF THE INVENTION

When a frequency converter operates in a steady state constant flux area, the flux vector draws a circular trajectory. In such a case, the torque can be kept in a simple manner within hysteresis limits by using zero vectors at required moments. When the frequency increases, less zero vectors are used on an average, and the angle of the flux vector affects the number of the zero vectors. The most zero vectors are used when the flux vector is close to the sector edges, and correspondingly, the least when the flux vector is in the middle section of the sectors. When the output frequency increases up till the field weakening point, zero vectors are not used in the middle sections of the sectors. In this situation, torque control cannot keep the torque within the hysteresis limits, and the field weakening control should reduce the flux in such a manner that the torque remains controllable.

In the method of the invention, torque control is implemented in such a manner that the used stator flux becomes smaller at the same time. In the method of the invention, a torque estimate $T_{pred}$ is predicted that would be achieved when a voltage vector change occurred at the instant of prediction, the predicted torque estimate is compared with a reference torque, the direction of travel and sector of a stator flux vector is defined, and the voltage vector change is implemented when the predicted torque estimate is smaller than the reference torque and the stator flux vector is moving in a positive direction of travel or when the torque estimate is greater than the reference torque and the stator flux vector is moving in a negative direction of travel.

This is implemented in such a manner that at a most suitable instant of time, a single voltage vector is selected that implements the reference torque at a predicted instant. In addition, this voltage vector is maintained until the reference torque is achieved, unless a second voltage vector should be selected earlier. There is then no attempt to keep the flux circular. At the instant of prediction, the flux detaches itself from the circle and attached again to it at the predicted instant.

Figure 1:
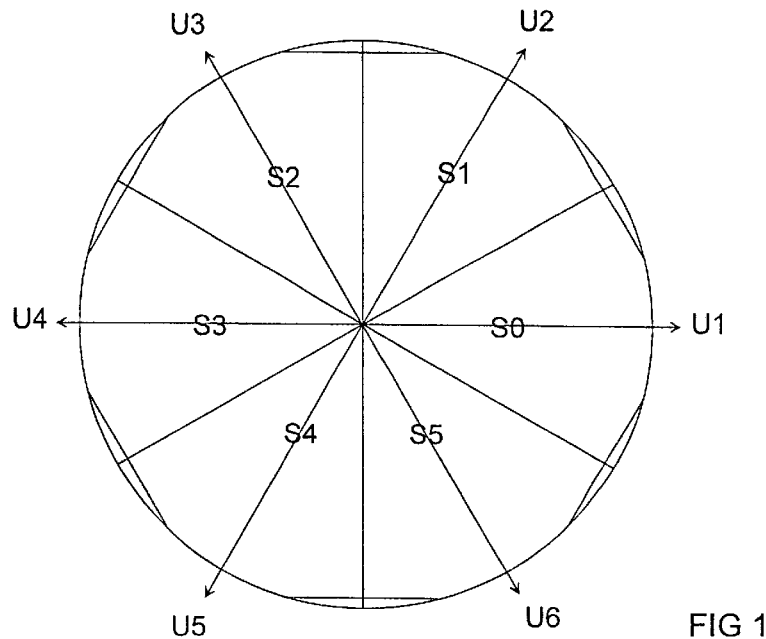
FIG. 1 shows the voltage vectors and flux circle of a frequency converter.

When the operating point of the controlled machine is in the field weakening region or close to it, it is checked in the fastest time domain of control whether the flux adjustment of the invention should be started or not. FIG. 1 shows the voltage vectors U1 to U6 of the frequency converter and the flux circle.

According to a preferred embodiment of the invention, the prediction of the torque estimate $T_{pred}$ takes place on the basis of a defined stator flux vector $\overline{\psi}_s$ and rotor flux vector $\overline{\phi}_r$ and the stator and rotor flux vector estimates produced by a possibly implemented voltage vector.

The rotor flux vector $\overline{\phi}_r$ can be defined in a reduced form as a function of the stator flux and current $$\overline{\phi}_r = \overline{\psi}_s - \delta L_s \overline{i}_s, \qquad (1)$$

wherein $\delta L_s$ is a constant term related to the controlled motor.

The torque that is typically calculated as a cross product of the stator flux and current can also be calculated using the stator and rotor fluxes $$T = \text{Im}\{\overline{\psi}_s^* \overline{i}_s\} = \text{Im}\{\overline{\psi}_s(-\overline{i}_s^*)\} = \frac{\text{Im}\{\overline{\psi}_s(\overline{\psi}_s^* - \delta L_s \overline{i}_s^*)\}}{\delta L_s} = \frac{\text{Im}\{\overline{\psi}_s \overline{\phi}_r^*\}}{\delta L_s} \quad (2)$$

Thus by predicting the behavior of the stator and rotor flux, a predicted value for the torque is obtained at the end of the adjustment. It is clear that the size of the stator flux cannot be measured from the motor, but it is estimated in the frequency converter by using a model made of the motor.

The execution of the adjustment and the operation of the method of the invention will now be described with reference to FIG. 3. The figure shows the defined stator flux vector $\overline{\psi}_s$ and rotor flux vector $\overline{\phi}_r$. The figure also shows a voltage vector U3, the selection of which moves the stator flux to the desired direction. For the sake of symmetry, both the starting point of the adjustment and its end point form the same angle with the edge line OA of the sector. Thus, the predicted stator flux $\overline{\psi}_{sp}$ is a mirror image of the defined stator flux and its direction can be calculated at its simplest by defining a new set of coordinates that is attached to the edge line OA of the sectors and by performing a coordinate transformation to the necessary flux vectors.

The coordinate transformation can be performed by defining a unit vector $\overline{s}$ that is parallel with the edge line of the sectors and the position of which is defined in the stator coordinate system $$\overline{s} = sx + j*sy.$$

The stator flux vector is in turn defined in the same coordinate system $$\overline{\psi}_s = flx + j*fly.$$

The coordinates of the stator flux can now be calculated in the edge line coordinate system as follows:

$$\begin{cases} ax = sx^* flx + sy * fly \\ ay = sy * flx - sx * fly \end{cases} \quad (3)$$

wherein flx is the x-directional component of the flux and fly is the y-directional component.

To calculate a predicted stator flux vector, the defined stator flux vector should be turned to the extent of the angle 2*atan(ay/ax). The predicted stator flux vector can, however, be calculated using a trigonometric function simply by multiplying the stator flux vector twice by the vector ax+j*ay. The predicted stator flux vector can be presented by using the auxiliary variables fx and fy in the component form $\overline{\psi}_{sp}$=flx_pred+j*fly_pred:

$$\begin{cases} fx = ax * flx - ay * fly \\ fy = ax * fly + ay * flx \\ \text{flx\_pred} = \dfrac{ax * fx - ay * fy}{flx * flx + fly * fly} \\ \text{fly\_pred} = \dfrac{ax * fy + ay * fx}{flx * flx + fly * fly} \end{cases} \quad (4)$$

To calculate a predicted rotor flux vector $\overline{\phi}_{rp}$, one should first define the time $\Delta t$ that the adjustment to be used requires. That is, the time during which the voltage vector selected at the prediction instant is kept valid. Let us assume that during the adjustment, the voltage Uc of the intermediate circuit of the frequency converter is constant, in which case the amount $\Delta\psi_s$ of the stator flux change is $$\Delta\psi_s = \frac{2}{3} U_c \Delta t \quad (5)$$

Figure 3:
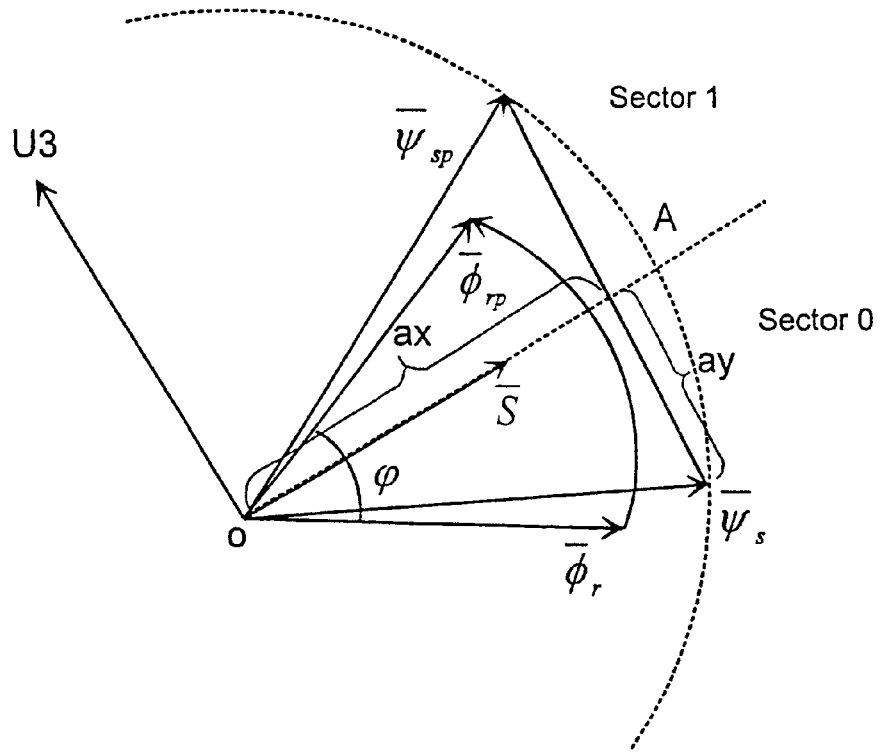
FIG. 3 shows the prediction of a torque vector as a vector diagram.

Then again, $\Delta\psi_s$ is defined in the edge line coordinate system in FIG. 3 as $$\Delta\psi_s = 2 * ay \quad (6)$$

By eliminating $\Delta\psi_s$ from the previous equations, the time $\Delta t$ is $$\Delta t = \frac{3 * ay}{U_c}. \quad (7)$$

During the adjustment, no significant changes occur in the angular speed of the rotor flux due to the inertial mass of the rotor. Therefore, the rotor flux turns during the adjustment to the extent of the angle $\phi=\Delta t\omega_s$, wherein $\omega_s$ is an average output frequency of the frequency converter during the adjustment. Thus, the turning angle of the rotor flux during the adjustment is $$\varphi = \frac{3 * ay}{U_c} * \omega_s. \quad (8)$$

Assuming that the amplitude of the rotor flux does not change during the adjustment, the predicted rotor flux vector is obtained by turning the original rotor flux to the extent of the angle $\phi$, i.e.

$$\overline{\phi}_{rp} = (\cos\Phi + j\sin\Phi)\overline{\phi}_r \quad (9)$$

This way, the predicted rotor and stator flux vectors are produced in a simple manner and at a sufficient accuracy so that the predicted torque can be calculated from them according to equation (2)

$$T_{pred} = \frac{Im\{\overline{\psi}_{sp} \overline{\phi}_{rp}^*\}}{\sigma L_s}. \quad (10)$$

When a torque estimate of a future time instant has been predicted as described above, this estimate is compared with the reference torque in accordance with the invention. If the result of the comparison is that the predicted torque is smaller than the reference torque when the flux turns into a positive direction, or if the predicted torque is greater than the reference torque when the flux turns into a negative direction, the adjustment should be performed immediately using the voltage vector used in making the prediction. Using this voltage vector is the fastest and most optimal way of achieving the reference torque.

Figure 4:
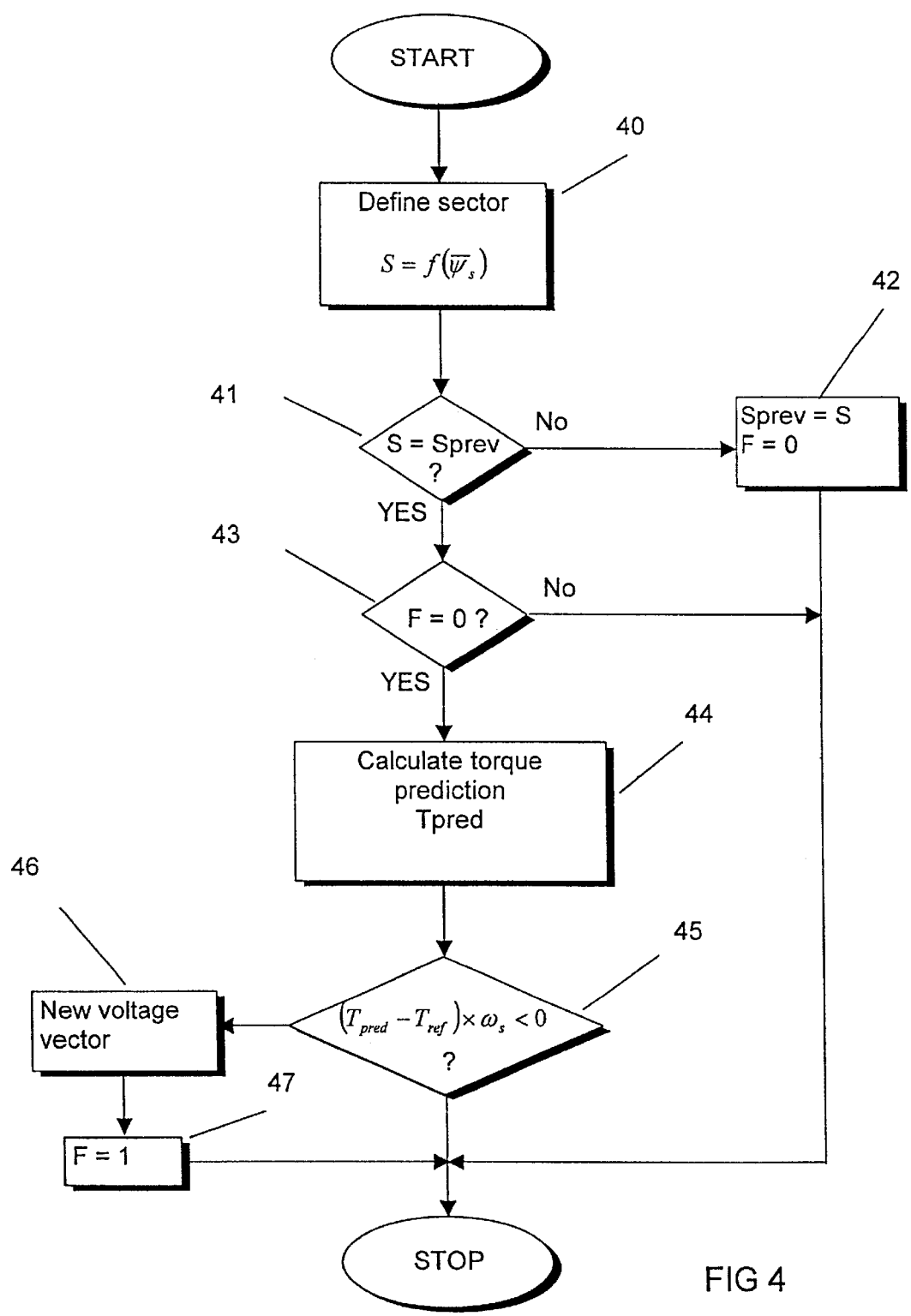
FIG. 4 shows a flow chart of the method of the invention.

FIG. 4 is a flow chart of the operation of the method of the invention. The flow chart is implemented for instance in the fastest time domain of control. When the method is started, a sector S, in which the stator flux vector is at the time in question, is defined 40. In the next step, the sector is checked 41 to see if it is the same as during the previous execution time. If the sector has changed, a variable Sprev is given 42 the value of the current sector S. At the same time, a state variable F is updated to the value 0 and the routine moves to the end of the chart. When the state variable F has the value 1, the beginning of the flux adjustment is ongoing (the sector has not yet changed). This is checked in block 43. When the beginning of the flux adjustment is ongoing, the routine moves to the end of the flow chart. If the sector has not changed (S=Sprev) and the end of the adjustment is ongoing (F=0), a prediction of the time instant in question is calculated 44 for the torque. The calculation of the prediction is performed as earlier described according to the equations (3) to (10).

Whether a new reference voltage needs to be implemented is defined 45 on the basis of the defined torque prediction, reference torque and stator flux turning direction. The definition is done by simply calculating the difference between the prediction and the reference and multiplying this difference by the angular speed of the stator. If this product is smaller than zero, the voltage vector is changed 46, otherwise the routine moves to the end of the chart. When changing the voltage vector, the state variable F is given 47 the value 1 as an indication for the next round that an adjustment is being made, but the changing point of the sector has not yet been reached.

Figure 2:
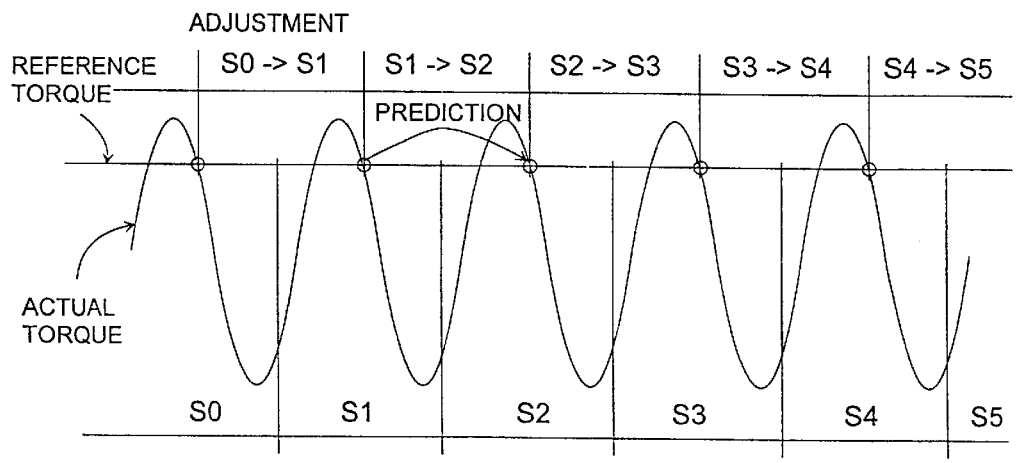
FIG. 2 shows a reference torque and an actual torque in a time domain.

FIG. 2 shows how the actual torque resonates once as the flux passes through the sector when using the method of the invention. The control method is, however, stable, because if for some reason the actual torque after the adjustment is smaller than predicted, the next adjustment starts earlier and causes a reduction in the stator flux, and the difference between the actual torque and the reference torque does not grow any more. This is based on the feature of the invention that the control method continuously calculates the most optimum adjustment instant. The system may have a permanent torque error due to torque prediction, but the torque control is still capable of accurately following the reference torque. A possible permanent error in the torque control should in any case be compensated using an integrator, for instance.

In the manner shown in FIG. 1, in partial field weakening, there are points between adjustments, in which the stator flux follows the flux circle defined by the reference flux. This occurs when the stator flux reaches the reference value before the start of the next adjustment. When operating in full field weakening, the stator flux touches the circle of the reference flux only at points parallel to the voltage vectors, and the flux becomes hexagonal. The same control principle works in both full and partial field weakening, since the predicted torque equals the reference value after each adjustment. If the actual torque tries to fall below the reference value, the same also occurs to the predicted torque, in which case the control system of the invention automatically selects larger adjustments.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for controlling a frequency converter having a reference torque, wherein the frequency converter controls a motor and operates torque-controlled partly or entirely in a field weakening region, the method comprising the steps of:

defining a direction of travel and sector of a stator flux vector in the motor, defining a voltage vector to be activated for a predetermined active time, said voltage vector following the flux vector, predicting at a time a torque produced by the voltage vector at the end of the active time of the voltage vector, as if the voltage vector was activated at the time of the prediction, comparing the predicted torque with the reference torque of the frequency converter, and implementing a voltage vector change when:
i) the predicted torque is smaller than the reference torque and the stator flux vector is moving in a positive direction of travel, or
ii) when the torque estimate is greater than the reference torque and the stator flux vector is moving in a negative direction of travel.

2. A method as claimed in claim 1, wherein the prediction of the torque comprises the steps of:

defining a stator flux vector and rotor flux vector of the motor being controlled by the frequency converter, predicting stator and rotor flux vector estimates produced by the voltage vector change, and calculating the torque on the basis of the predicted stator and rotor flux vector estimates.

* * * * *

UNITED STATES PATENT AND TRADEMARK OFFICE
CERTIFICATE OF CORRECTION

PATENT NO. : 6,552,510 B2
DATED : April 22, 2003
INVENTOR(S) : Samuli Heikkila

It is certified that error appears in the above-identified patent and that said Letters Patent is hereby corrected as shown below:

<u>Title page,</u>
Item [30], should read -- [30] Foreign Application Priority Data
Dec. 22, 2000   (FI)………………………………..20002843 --

Signed and Sealed this

Twenty-first Day of October, 2003

JAMES E. ROGAN
*Director of the United States Patent and Trademark Office*